(12) United States Patent
Ferreira et al.

(10) Patent No.: US 11,423,138 B2
(45) Date of Patent: Aug. 23, 2022

(54) FIRMWARE ACCESS BASED ON TEMPORARY PASSWORDS

(71) Applicant: Hewlett-Packard Development Company, L.P., Spring, TX (US)

(72) Inventors: Ronaldo Rodrigues Ferreira, Porto Alegre (BR); Edson Schardosim Behnck, Porto Alegre (BR); Juliano Francisco Cagnini Ciocari, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,344

(22) PCT Filed: Nov. 14, 2018

(86) PCT No.: PCT/US2018/060876
§ 371 (c)(1),
(2) Date: Nov. 2, 2020

(87) PCT Pub. No.: WO2020/101658
PCT Pub. Date: May 22, 2020

(65) Prior Publication Data
US 2021/0264017 A1 Aug. 26, 2021

(51) Int. Cl.
*G06F 21/45* (2013.01)
*H04L 9/40* (2022.01)
*G06F 21/00* (2013.01)

(52) U.S. Cl.
CPC .......... *G06F 21/45* (2013.01); *H04L 63/0846* (2013.01)

(58) Field of Classification Search
CPC .......... G06F 21/45; G06F 21/31; G06F 21/34; G06F 21/42; G06F 21/44; G06F 21/572; G06F 21/575; H04L 63/0846
See application file for complete search history.

(56) References Cited

U.S. PATENT DOCUMENTS

| 7,210,166 B2 | 4/2007 | Davis et al. |
| 8,214,653 B1 * | 7/2012 | Marr .................... G06F 8/65 |
| | | 713/189 |

(Continued)

FOREIGN PATENT DOCUMENTS

EP 3239877 A1 11/2017

OTHER PUBLICATIONS

Anonymous, "A Framework for Granting Exceptions to a Printer/Copier's Security Policy", Research disclosure, Kenneth Mason Publications, vol. 485, No. 77, Sep. 1, 2004, pp. 1-3.

*Primary Examiner* — Edward Zee
(74) *Attorney, Agent, or Firm* — HPI Patent Department (57) ABSTRACT

An example computing device includes a communication device, an input device, a storage device, firmware stored in the storage device, and a processor. The processor is to: in response to receiving a set of credentials, transmit a request to a server via the communication device, where the request includes the set of credentials and identification information of the computing device; receive a temporary password and expiration information of the temporary password from the server via the communication device; replace a password of the firmware with the temporary password; in response to receiving the temporary password via the input device, determine if the temporary password is valid based on the expiration information; and in response to a determination that the temporary password is valid, provide access to the firmware.

10 Claims, 7 Drawing Sheets

(56) References Cited

U.S. PATENT DOCUMENTS

| | | |
|---|---|---|
| 8,321,929 B2 | 11/2012 | Jaber et al. |
| 9,047,452 B2 | 6/2015 | Dailey et al. |
| 9,400,895 B2 | 7/2016 | Dadu et al. |
| 9,519,784 B2 | 12/2016 | Graham |
| 9,734,311 B1 | 8/2017 | Righi et al. |
| 10,007,779 B1 | 6/2018 | McClintock et al. |
| 2004/0181696 A1* | 9/2004 | Walker ................ H04L 63/0846 726/6 |
| 2008/0010453 A1 | 1/2008 | Hamid |
| 2008/0141037 A1* | 6/2008 | Cheston .................. G06F 21/31 713/184 |
| 2009/0313687 A1 | 12/2009 | Popp et al. |
| 2013/0019281 A1 | 1/2013 | Jacobs et al. |
| 2013/0179941 A1 | 7/2013 | McGloin et al. |
| 2014/0068746 A1 | 3/2014 | Gonzalez Martinez et al. |
| 2015/0047022 A1 | 2/2015 | Von der Lippe et al. |
| 2017/0149770 A1 | 5/2017 | Hinton et al. |

* cited by examiner

FIRMWARE ACCESS BASED ON TEMPORARY PASSWORDS

BACKGROUND

Guarding against unauthorized access to firmware of a computing device is an important aspect of device security, as the firmware has full control of the computing device. If the firmware is compromised, the entire computing device may be at risk.

BRIEF DESCRIPTION OF THE DRAWINGS

Some examples of the present application are described with respect to the following figures.

DETAILED DESCRIPTION

To guard against unauthorized access to the firmware of a computing device, a password may be assigned to the firmware. The computing device may grant access to the firmware after the correct password has been entered. A user of the computing device may forget the password. In some situations, the user may write down the password so that the password may be easily found later. Physically writing down a password creates a new security risk as the password can now be easily obtained by other people.

Examples described herein provide an approach to access firmware of a computing device via temporary passwords. For example, a computing device may include a communication device, a storage device, firmware stored in the storage device, and a processor. The processor may, in response to receiving a set of credentials, transmit a request to a server via the communication device, where the request includes the set of credentials and identification information of the computing device. The processor may also receive a temporary password and expiration information of the temporary password from the server via the communication device. The processor may further replace a password of the firmware with the temporary password. The processor may further, in response to receiving the temporary password via an input device connected to the computing device, determine if the temporary password is valid based on the expiration information. The processor may further, in response to a determination that the temporary password is valid, provide access to the firmware.

In another example, a computing device may include a communication device and a processor. The processor may receive a request to generate a temporary password for a client device, where the request includes a set of credentials and identification information of the client device. The processor may also authenticate the request using the set of credentials. The processor may further, in response to a successful authentication of the request, generate the temporary password. The processor may further transmit the temporary password, firmware access information, and expiration information of the temporary password to the client device. The processor may further transmit the temporary password to a password receiving entity.

In another example, a non-transitory computer-readable storage medium may include instructions that when executed cause a processor of a computing device to: in response to receiving a set of credentials, transmit a request to a server, where the request includes the set of credentials and identification information of the computing device; receive a temporary password, firmware access information, and expiration information of the temporary password from the server via a communication device of the computing device; replace a password of the firmware with the temporary password; in response to receiving the temporary password via an input device connected to the computing device, determine if the temporary password is valid based on the expiration information; and in response to a determination that the temporary password is valid, provide access to a set of configurations of the firmware based on the firmware access information. Examples described herein may increase the security and/or convenience associated with accessing firmware of a computing device.

Figure 1:
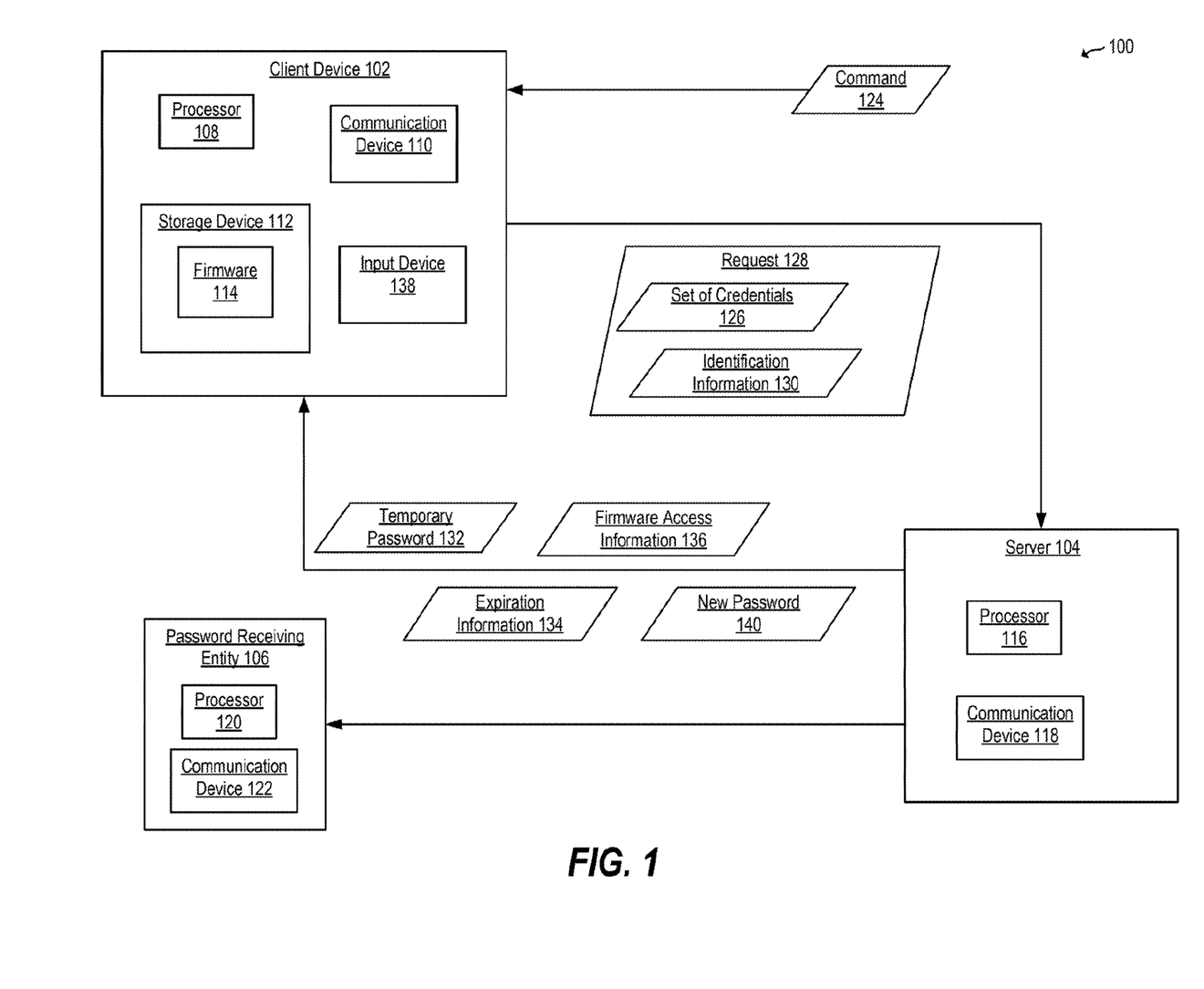
FIG. 1 illustrates a system to provide access to firmware of a computing device via a temporary password, according to an example.

FIG. 1 illustrates a system 100 to provide access to firmware of a computing device via a temporary password, according to an example. System 100 may include a client device 102, a server 104, and a password receiving entity 106.

As used herein, client device 102 may be, for example, a notebook computer, a desktop computer, an all-in-one computer, a tablet computing device, a cellular phone, or any other electronic device suitable to provide access to firmware of the device via a temporary password. As used herein, server 104 may be, for example, a web-based server, a local area network server, a cloud-based server, or any other electronic device suitable to generate a temporary password for firmware access at client device 102. As used herein, password receiving entity 106 may be a notebook computer, a desktop computer, an all-in-one computer, a tablet computing device, a cellular phone, a printer, or any other electronic device suitable to receive a temporary password.

Client device 102 may include a processor 108, a communication device 110, an input device 138, a storage device 112, and firmware 114. As used herein, processor 108 may be may be a central processing unit (CPU), a semiconductor-based microprocessor, and/or other hardware devices suitable for retrieval and execution of instructions stored in client device 102. Processor 108 may control operations of client device 102.

As used herein, input device 138 may be a piece of hardware equipment that provides data and control signals to processor 108. Input device 138 may be a mouse, a keyboard, a joystick, a touchpad, a touchscreen, voice processing circuitry, etc.

As used herein, communication device 110 may be a piece of hardware equipment that transmits and/or receives data via a medium. In some examples, communication device 110 may be implemented as an Ethernet network adapter. An example Ethernet network adapter may be an Ethernet network adapter that transmits and/or receives information based on the Institute of Electrical and Electronics Engineers (IEEE) 802.3-2008 specification. In some examples, communication device 110 may be implemented as a wireless network adapter. An example wireless network adapter may be a wireless network adapter that transmits and/or receives information based on the IEEE 802.11 family of specifications (802.11n, 802.11g, etc.) Another example wireless network adapter may be a wireless network adapter that transmits and/or receives information based on the Bluetooth specification.

As used herein, storage device 112 may be implemented using non-volatile memory, such as flash memory. Non-volatile memory may retain stored data even after having been power cycled. In some examples, storage device 112 may be implemented using an Electrically Erasable Programmable Read-Only Memory (EEPROM) device (e.g., an EEPROM chip).

As used herein, firmware 114 may be a series of instructions that are executable by processor 108. Firmware 114 may be stored in non-volatile memory, such as storage device 112. Firmware 114 may be the Basic Input/Output System (BIOS) of client device 102 that initializes hardware of client device 102 and loads an operating system when client device 102 is botting up. Firmware 114 may be implemented based on the Unified Extensible Firmware Interface (UEFI) specification.

Server 104 may include a processor 116 and a communication device 118. Processor 116 may control operations of server 104. Password receiving entity 106 may include a processor 120 and a communication device 122. Processor 120 may control operations of password receiving entity 106. Processors 116 and 120 may be similar to processor 108. Communication devices 118 and 122 may be similar to communication device 110.

During operation, client device 102 may receive a command 124 to access firmware 114. For example, a user of client device 102 may press the F10 key during a boot up process of client device 102. The press of the F10 key during the boot up process may correspond to command 124 to access firmware 114. In response to receiving command 124, firmware 114 may display a graphical user interface (GUI) to request a set of credentials 126 via a display device (not shown in FIG. 1) connected to client device 102.

As used herein, set of credentials 126 may be information that provides an identity of a user. In some examples, set of credentials 126 may include a user name, a password, or a combination thereof. In some examples, set of credentials 126 may include biometric information, such as fingerprint information, a retinal scan, a voice recording, etc. In some examples, set of credentials 126 may include a cryptographic key certificate.

Firmware 114 may receive set of credentials 126 from the user (e.g., via input device 138). In response to receiving set of credentials 126, firmware 114 may transmit a request 128 to generate a temporary password 132 for firmware 114 to server 104 via communication device 110. Request 128 may include set of credentials 126 and identification information 130 of client device 102.

As used herein, identification information 130 may be any information that distinguishes client device 102 from other devices. In some examples, identification information 130 may be an Internet Protocol (IP) address assigned to client device 102. In some examples, identification information 130 may be an identifier of client device 102, such as a device name, a media access control (MAC) address, etc. In some examples, identification information 130 may be a combination of the IP address and the identifier.

In response to receiving request 128, server 104 may authenticate request 128 using set of credentials 126. For example, server 104 may compare set of credentials 126 to a credential database (not shown in FIG. 1) stored in server 104. Server 104 may successfully authenticate request 128 when set of credentials 126 matches an entry in the database. Server 104 may determine that the authentication of request 128 has failed when set of credentials 126 do not match any entry in the database.

In response to a failed authentication, server 104 may notify client device 102 of the failed authentication and deny request 128. In response to a successful authentication of request 128, server 104 may generate temporary password 132, expiration information 134, and firmware access information 136 based on request 128. Expiration information 134 may indicate the expiration of temporary password 132. In some examples, expiration information 134 may include a time duration (e.g., in hours, in days, etc.). In some examples, expiration information 134 may include a count of password authentication performed. The count may be for successful authentications only. The count may be for failed authentications only. The count may be for both successful and failed authentications. In some examples, expiration information 134 may be a combination of a time duration and a count of password authentication performed.

Firmware access information 136 may indicate a set of configurations of firmware 114 that is modifiable by the user. Server 104 may generate firmware access information 136 using an entitlement manifest associated with identification information 130. An example entitlement manifest is described in more detailed in FIG. 2.

Server 104 may transmit temporary password 132, expiration information 134, and firmware access information 136 to client device 102. Server 104 may also transmit temporary password 132 to password receiving entity 106. Server 104 may determine password receiving entity 106 based on the entitlement manifest.

In response to receiving temporary password 132 from server 104, firmware 114 may replace a password of firmware 114 with temporary password 132. Thus, temporary password 132 becomes the password of firmware 114. When the user receives temporary password 132 at password receiving entity 106, the user may enter temporary password 132 at client device 102 via input device 138 to access firmware 114.

In response to receiving temporary password 132 via input device 138, firmware 114 may determine if temporary password 132 is valid based on expiration information 134. For example, expiration information 134 may indicate that temporary password 132 is valid for 24 hours after client device 102 receives temporary password 132. Firmware 114 may compare the time when temporary password 132 was received from server 104 to the current time (when temporary password 132 was received via input device 138). If less than 24 hours have passed, then firmware 114 may determine that temporary password 132 is valid. If more than 24 hours have passed, then firmware 114 may determine that temporary password 132 is not valid.

In response to a determination that temporary password 132 is valid, client device 102 may provide access to firmware 114. For example, firmware 114 may present a set of configurations of firmware 114 in a graphical user interface based on firmware access information 136. By using temporary password 132 to access firmware 114, the need for a user of client device 102 to memorize the password may be avoided. Presenting a set of configurations of firmware 114 is described in more detailed in FIG. 3C.

Server 104 may keep track of the validity of temporary password 132 based on expiration information 134. Upon an expiration of temporary password 132, server 104 may generate a new password 140 for firmware 114. Server 104 may transmit new password 140 to client device 102. Firmware 114 may replace temporary password 132 with new password 140 as the password of firmware 114.

In some examples, upon the expiration of temporary password 132, a password update grace period may begin at firmware 114. If firmware 114 fails to replace temporary password 132 with new password 140 as the password of firmware 114 before an expiration of the password update grace period, firmware 114 may set a status of firmware 114 as non-compliant upon the expiration of the password update grace period. When firmware 114 is set as non-compliant, firmware 114 may have to be locked and may be not able to be accessed via any temporary password from server 104. An administrator may have to manually unlock firmware 114 to change the status to compliant.

Figure 2:
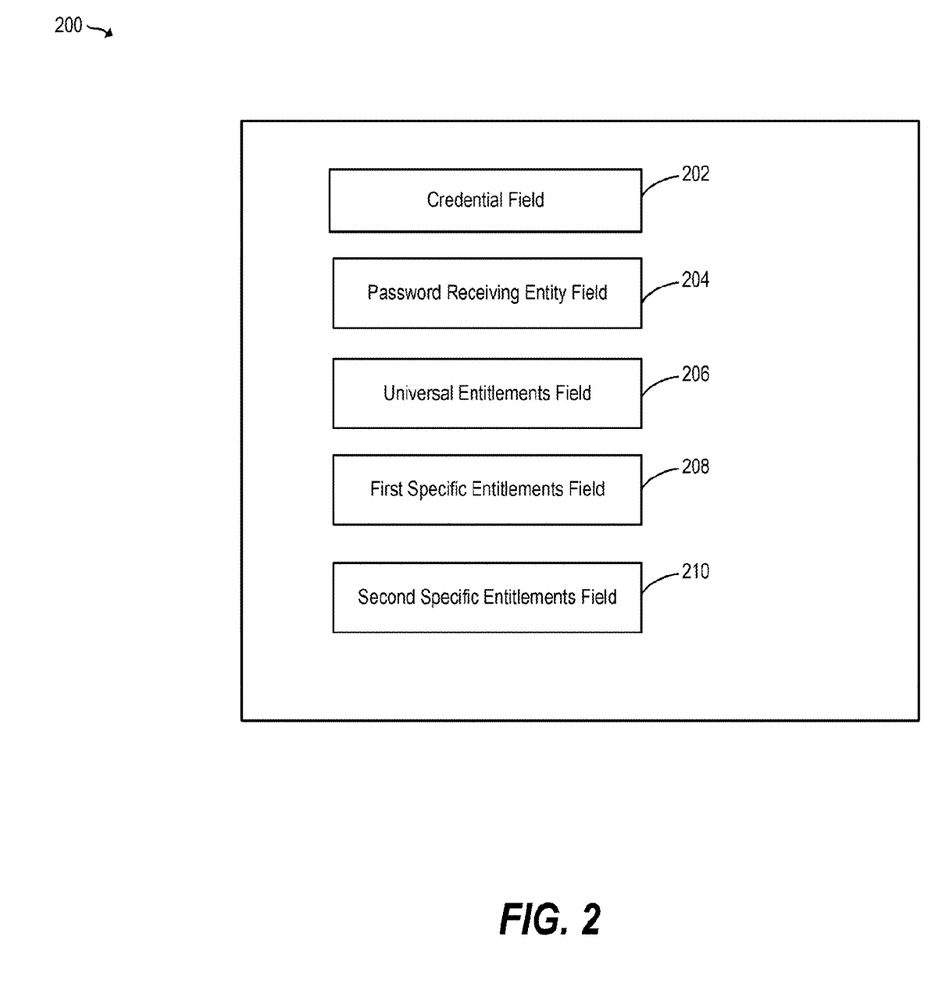
FIG. 2 illustrates an entitlement manifest associated with access to firmware, according to an example.

FIG. 2 illustrates an entitlement manifest 200 associated with access to firmware, according to an example. Entitlement manifest 200 may be stored in server 104. Server 104 may store a plurality of entitlement manifests. Each entitlement manifest may be specific to a unique set of credentials. For example, entitlement manifest 200 may be specific to set of credentials 126.

Entitlement manifest 200 may include a credential field 202. Credential field 202 may indicate a set of credentials that entitlement manifest 200 is associated with, such as set of credentials 126. Entitlement manifest 200 may also include a password receiving entity field 204. Password receiving entity field 204 may indicate how temporary password 132 is transmitted to a user with set of credentials 126. For example, password receiving entity field 204 may list a phone number to receive temporary password 132 as a text message, an email address to receive temporary password 132 as an email, a printer name and/or location where temporary password 132 is printed, etc.

Entitlement manifest 200 may further include a universal entitlements field 206. In some examples, universal entitlements field 206 may indicate a particular set of configurations of firmware 114 that is modifiable for set of credentials 126. For example, universal entitlements field 206 may indicate that settings of onboard serial port and Universal Serial Bus (USB) port are modifiable for set of credentials 126. In some examples, universal entitlements field 206 may indicate a category of configurations that are modifiable for set of credentials 126. For example, universal entitlements field 206 may indicate that all settings under the security category are modifiable.

Entitlement manifest 200 may further include a first specific entitlements field 208 and a second specific entitlements field 210. First specific entitlements field 208 may indicate a first particular set of configurations of firmware 114 that is modifiable for set of credentials 126 and a first computing device. The first computing device may be identified by a first IP address, a first MAC address, a first device name, or a combination thereof. Second specific entitlements field 210 may indicate a second particular set of configurations of firmware 114 that is modifiable for set of credentials 126 and a second computing device different from the first computing device. The second computing device may be identified by a second IP address, a second MAC address, a second device name, or a combination thereof.

As an example, when a user provides set of credentials 126 to access firmware of any computing device, the onboard serial port configuration of the computing device may be modifiable by the user as indicated by universal entitlements field 206.

When the user provides set of credentials 126 on the first computing device, in addition to being able to modify the onboard serial port configuration of the first computing device as indicated by universal entitlements field 206, the user is also able to modify the onboard sound card configuration of first computing device as indicated by first specific entitlements field 208.

When the user provides set of credentials 126 on the second computing device, in addition to being able to modify the onboard serial port configuration of the first computing device as indicated by universal entitlements field 206, the user is also able to modify the boot order configuration of second computing device as indicated by second specific entitlements field 210. By using different entitlement fields, an administrator may grant a user different levels of access to firmware of a computing device based on the set of credentials used, the identity of the computing device used, or a combination thereof.

Figure 3A:
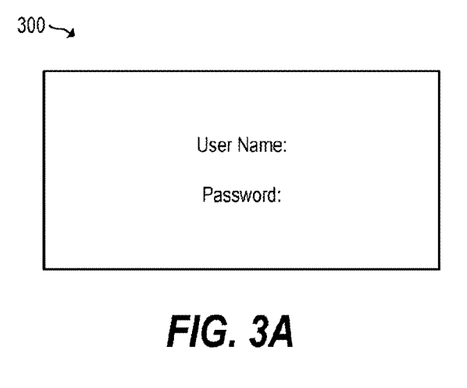
FIG. 3A illustrates a graphical user interface to request a set of credentials to generate a temporary password to access firmware of a computing device, according to an example.
Figure 3B:
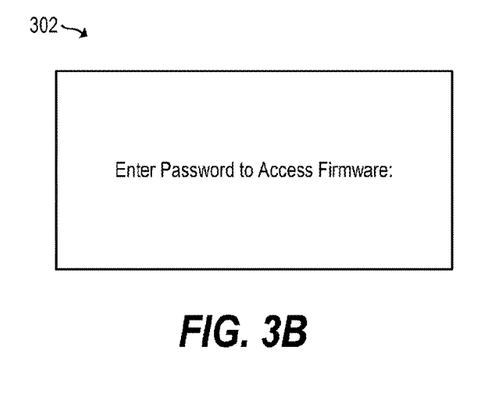
FIG. 3B illustrates a graphical user interface to request a password to access firmware of a computing device, according to an example.
Figure 3C:
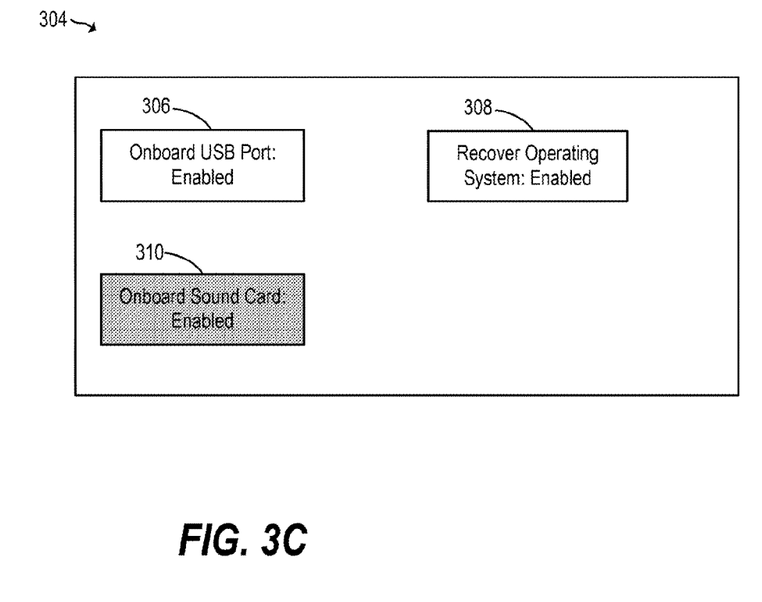
FIG. 3C illustrates a graphical user interface of firmware of a computing device, according to an example.

FIGS. 3A-3C illustrate a process of accessing firmware 114 from the perspective of a user of client device 102, according to an example. FIGS. 3A-30 may be described with reference to FIGS. 1-2. FIG. 3A illustrates a graphical user interface (GUI) 300 to request a set of credentials to generate a temporary password to access firmware of a computing device, according to an example.

GUI 300 may be displayed when the user of client device 102 presses a key to access firmware 114. GUI 300 may prompt the user to enter set of credentials 126. As an example, set of credentials 126 may be a user name and a password. Turning to FIG. 3B, FIG. 3B illustrates a GUI 302 to request a password to access firmware of a computing device, according to an example. After the user enters the user name and the password, GUI 302 may be displayed to prompt the user to enter temporary password 132. After the user enters temporary password 132, client device 102 may provide access to firmware 114.

Turning to FIG. 3C, FIG. 3C illustrates a GUI 304 of firmware of a computing device, according to an example. GUI 304 may be a GUI of firmware 114. GUI 304 may display configurations of firmware 114. GUI 304 may include a first configuration 306, a second configuration 308, and a third configuration 310. Configurations 306 and 308 may be modifiable by the user. Third configuration 310 may not be able to be modified by the user, as indicated by greying out third configuration 310. As an example, configurations 306 and 308 may correspond to a set of configurations modifiable by a user included in firmware access information 136. Third configuration 310 may be omitted in firmware access information 136 or may be indicated as not modifiable by a user in firmware access information 136. Thus, when the user gains access to firmware 114, the user may not be able to modify third configuration 310.

Figure 4:
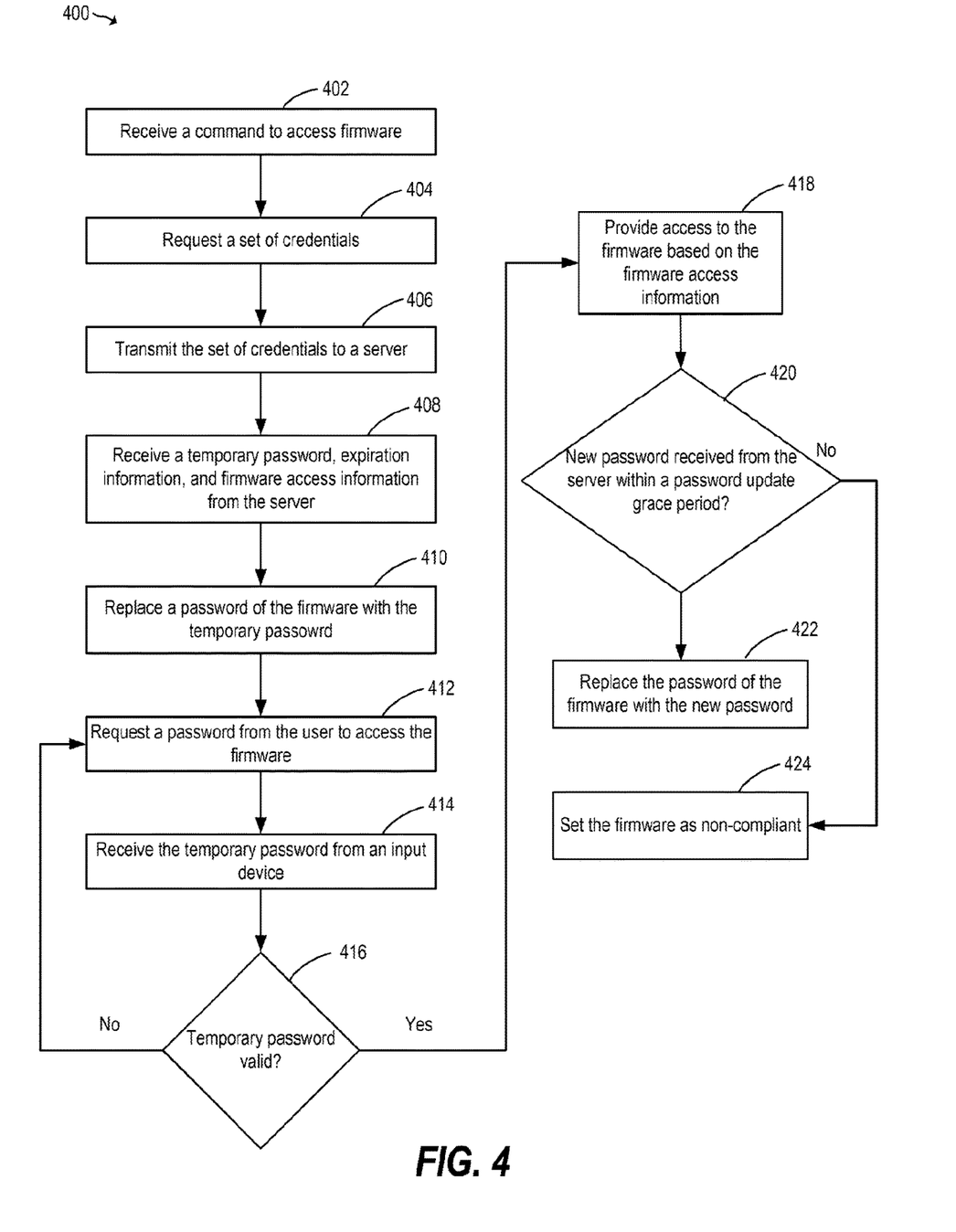
FIG. 4 illustrates a method of operation at a computing device to provide access to firmware based on a temporary password, according to an example.

FIG. 4 illustrates a method 400 of operation at a computing device to provide access to firmware based on a temporary password, according to an example. Method 400 may be implemented by client device 102 of FIG. 1.

Method 400 may include receiving a command to access firmware, at 402. For example, client device 102 may receive a command to access firmware 114. The command may be entered by a user of client device 102 during a boot up process of client device 102. Method 400 may also include requesting a set of credentials, at 404. For example, in response to receiving the command, client device 102 may request a set of credentials from the user.

Method 400 may further include transmitting the set of credentials to a server, at 406. For example, in response to receiving set of credentials 126, client device 102 may transmit set of credentials 126 to server 104. Method 400 may further include receiving a temporary password, expiration information, and firmware access information from the server, at 408. For example, client device 102 may receive temporary password 132, expiration information 134, and firmware access information 136 from server 104.

Method 400 may further include replacing a password of the firmware with the temporary password, at 410. For example, client device 102 may set the password of firmware 114 as temporary password 132, thus replacing the previous password of firmware 114. Method 400 may further include requesting a password from the user to access the firmware, at 412. For example, client device 102 may prompt the user to enter a password to access firmware 114.

Method 400 may further include receiving the temporary password from an input device, at 414. For example, client device 102 may receive temporary password 132 via input device 138 from the user. Method 400 may further include determining if the temporary password is valid, at 416. For example, in response to receiving temporary password 132 via input device 138, firmware 114 may determine if temporary password 132 is valid based on expiration information 134. When the temporary password is invalid, method 400 may move to 412 to request a password to access the firmware. When the temporary password is valid, method 400 may further include providing access to the firmware based on the firmware access information, at 418. For example, firmware 114 may present a set of configurations of firmware 114 in a GUI based on firmware access information 136.

Method 400 may further include determining if a new password has been received from the server within a password update grace period, at 420. For example, upon the expiration of temporary password 132, a password update grace period may begin at firmware 114. When client device 102 receives the new password, method 400 may further include replacing the password of the firmware with the new password, at 422. For example, firmware 114 may replace temporary password 132 with new password 140 as the password of firmware 114. When client device 102 fails to receive the new password before the expiration of the password update grace period, method 400 may further include setting the firmware as non-compliant. For example, if firmware 114 fails to replace temporary password 132 with new password 140 as the password of firmware 114 before an expiration of the password update grace period, firmware 114 may be set as non-compliant upon the expiration of the password update grace period.

Figure 5:
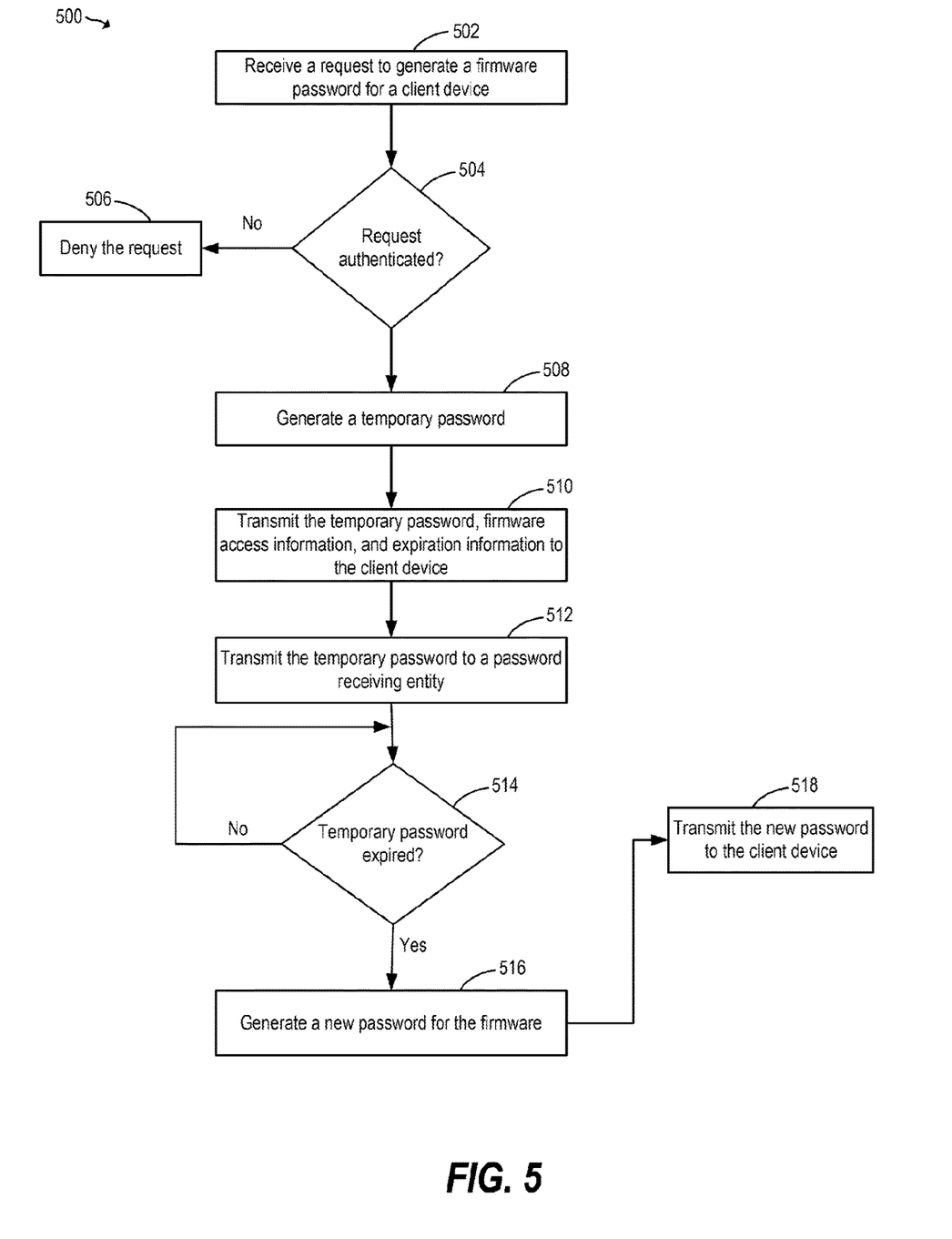
FIG. 5 illustrates a method of operation at a computing device to generate a temporary password for firmware access, according to an example.

FIG. 5 illustrates a method 500 of operation at a computing device to generate a temporary password for firmware access, according to an example. Method 500 may be implemented by server 104.

Method 500 may include receiving a request to generate a temporary password for a client device, at 502. For example, server 104 may receive request 128 from client device 102. Method 500 may also include authenticating the request, at 504. For example, server 104 may authenticate request 128 using set of credentials 126.

When the request fails to be authenticated, method 500 may further include denying the request, at 506. For example, in response to a failed authentication, server 104 may notify client device 102 of the failed authentication and deny request 128. When the request has been successfully authenticated, method 500 may further include generating a temporary password. For example, server 104 may generate temporary password 132. Method 500 may further include transmitting the temporary password, firmware access information, and expiration information to the client device, at 510. For example, server 104 may transmit temporary password 132, expiration information, and firmware access information 136 to client device 102.

Method 500 may further include transmitting the temporary password to a password receiving entity, at 512. For example, server 104 may also transmit temporary password 132 to password receiving entity 106. Method 500 may further include determining if the temporary password has expired, at 514. For example, server 104 may keep track of the validity of temporary password 132 based on expiration information 134. When the temporary password is still valid, method 500 may continue to check the validity of the temporary password. When the temporary password is invalid (i.e., expired), method 500 may further include generating a new password for the firmware, at 516. For example, upon an expiration of temporary password 132, server 104 may generate a new password 140 for firmware 114. Method 500 may further include transmitting the new password to the client device, at 518. For example, server 104 may transmit new password 140 to client device 102.

Figure 6:
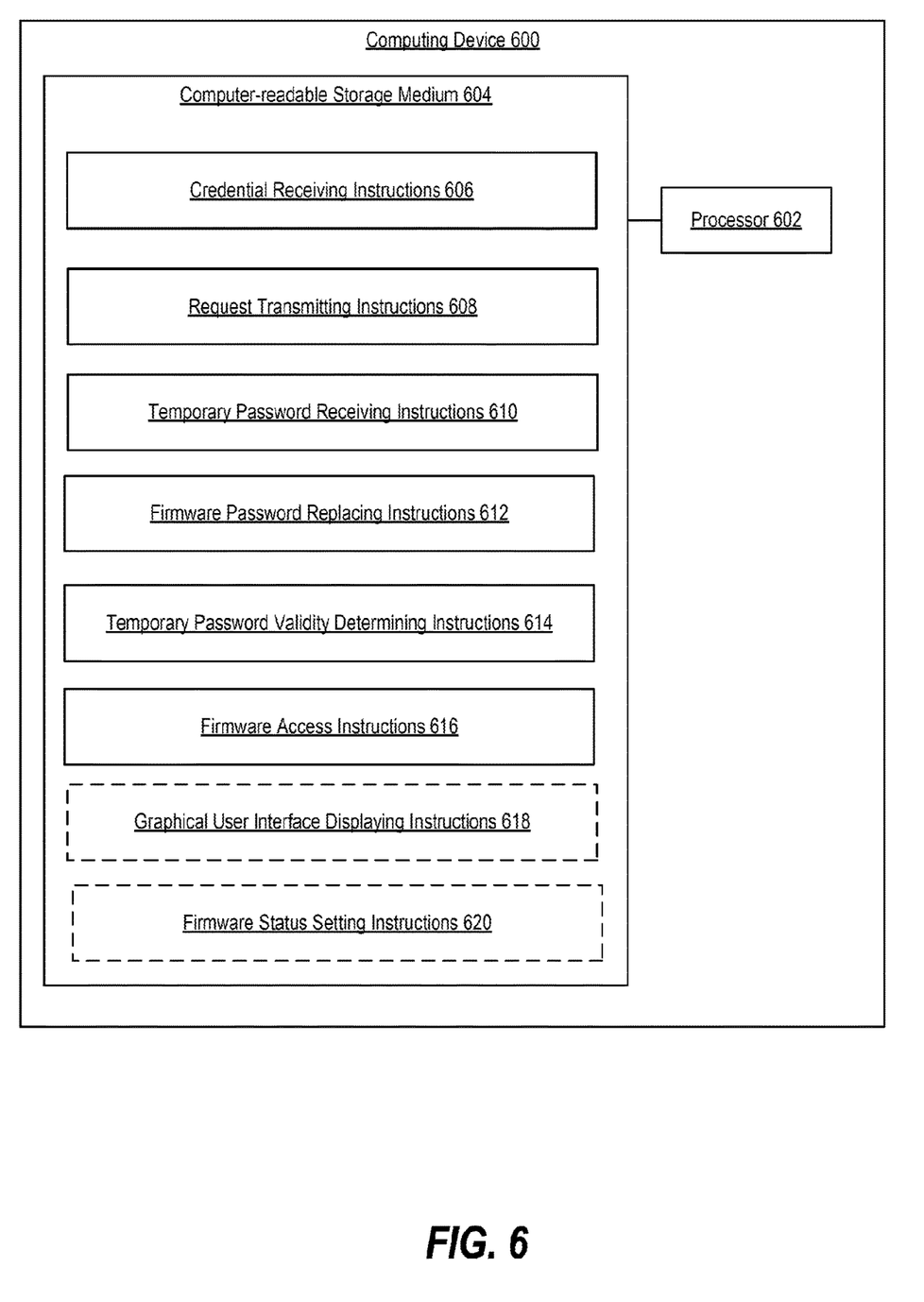
FIG. 6 illustrates a computing device to provide access to firmware based on a temporary password, according to an example.

FIG. 6 illustrates a computing device 600 to provide access to firmware based on a temporary password, according to an example. Computing device 600 may implement client device 102. Computing device 600 may include a processor 602 and a computer-readable storage medium 604. Processor 602 may be similar to processor 108.

Computer-readable storage medium 604 may be any electronic, magnetic, optical, or other physical storage device that contains or stores executable instructions. Thus, computer-readable storage medium 604 may be, for example, Random Access Memory (RAM), an Electrically Erasable Programmable Read-Only Memory (EEPROM), a storage device, an optical disc, etc. In some examples, storage medium 504 may be a non-transitory storage medium, where the term "non-transitory" does not encompass transitory propagating signals. Computer-readable storage medium 604 may be encoded with a series of processor executable instructions 606, 608, 610, 612, 614, 616. In some examples, computer-readable storage medium 604 may also be encoded with instructions 618 and 620.

Credential receiving instructions 606 may receive a set of credentials. For example, referring to FIG. 1, client device 102 may receive set of credentials 126. Request transmitting instructions 608 may transmit a request to server 104 to generate a firmware password. For example, referring to FIG. 1, client device 102 may transmit request 128 to server 104.

Temporary password receiving instructions 610 may receive a temporary password. For example, referring to FIG. 1, client device 102 may receive temporary password 132 from server 104. Firmware password replacing instructions 612 may replace a password of firmware. For example, referring to FIG. 1, client device 102 may replace a password of firmware 114 with temporary password 132. Temporary password validity determining instructions 614 may determine if the temporary password is still valid (i.e., if the temporary password has expired). For example, in response to receiving temporary password 132 via input device 138, client device 102 may determine if temporary password 132 is valid based on expiration information 134. Firmware access instructions 616 may provide access to firmware. For example, referring to FIG. 1, in response to a determination that temporary password 132 is valid, client device 102 may provide access to firmware 114.

Graphical user interface (GUI) displaying instructions 618 may display GUIs. For example, referring to FIGS. 3A-3C, client device 102 may cause a display connected to client device 102 to display GUIs 300, 302, and 304. Firmware status setting instructions 620 may set a status of firmware. For example, referring to FIG. 1, if firmware 114 fails to replace temporary password 132 with new password 140 as the password of firmware 114 before an expiration of the password update grace period, firmware 114 may set a status of firmware 114 as non-compliant upon the expiration of the password update grace period.

Figure 7:
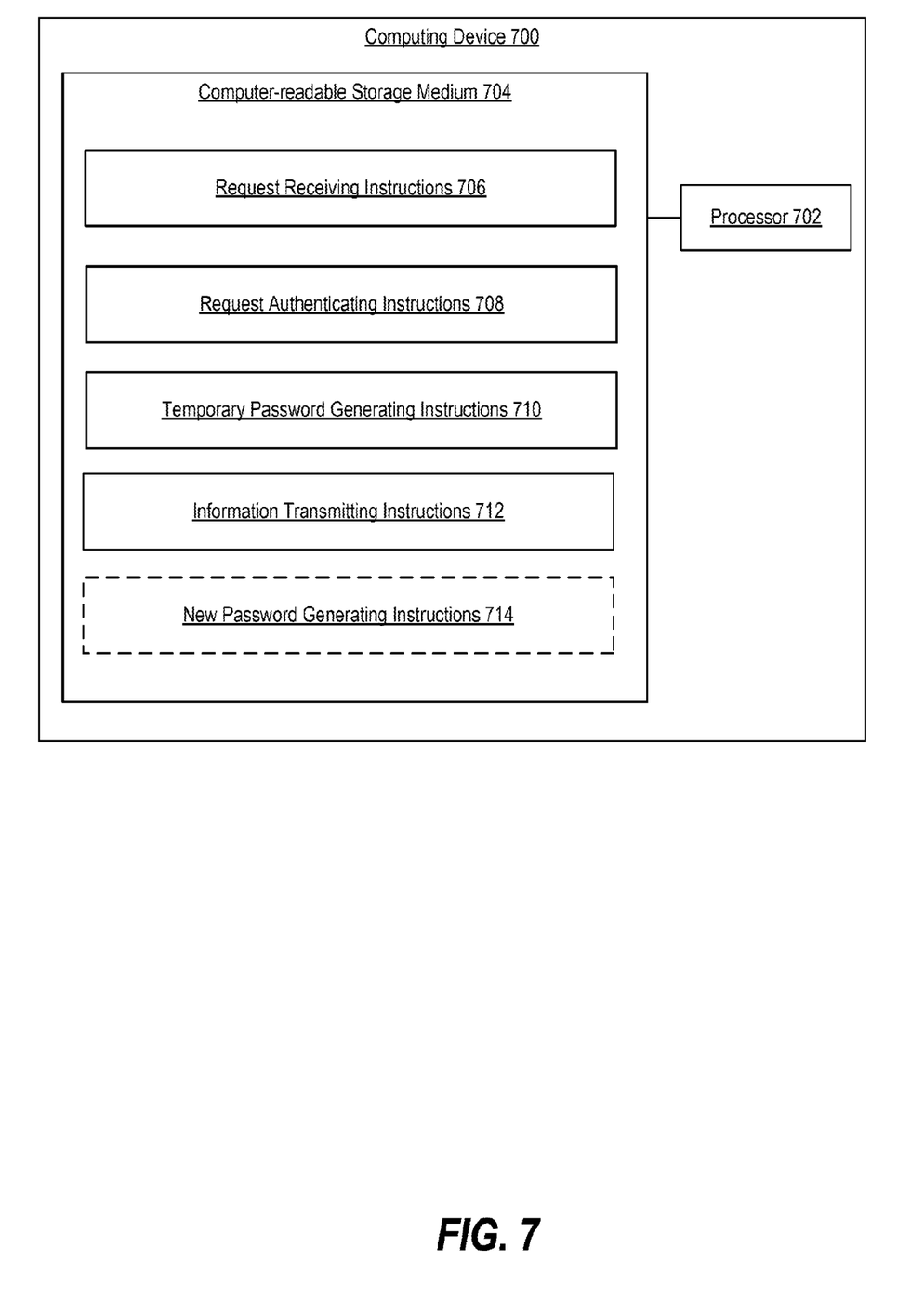
FIG. 7 illustrates a computing device to generate a temporary password for firmware access, according to an example.

FIG. 7 illustrates a computing device 700 to generate a temporary password for firmware access, according to an example. Computing device 700 may implement server 104. Computing device 700 may include a processor 702 and a computer-readable storage medium 704. Processor 702 may be similar to processor 108. Computer-readable storage medium 704 may be similar to computer-readable storage medium 604. Computer-readable storage medium 704 may be encoded with instructions 706, 708, 710, and 712. In some examples, computer-readable storage medium 704 may also be encoded with instructions 714.

Request receiving instructions 706 may receive a request to generate a temporary password for a client device. For example, referring to FIG. 1, server 104 may receive request 128 to generate temporary password 132. Request authenticating instructions 708 may authenticate a request. For example, referring to FIG. 1, server 104 may authenticate request 128.

Temporary password generating instructions 710 may generate a temporary password. For example, referring to FIG. 1, server 104 may generate temporary password 132. Information transmitting instructions 712 may transmit information. For example, referring to FIG. 1, server 104 may transmit temporary password 132, expiration information 134, and firmware access information 136 to client device 102. New password generating instructions 714 may generate a new password. For example, referring to FIG. 1, server 104 may generate new password 140.

The use of "comprising", "including" or "having" are synonymous and variations thereof herein are meant to be inclusive or open-ended and do not exclude additional unrecited elements or method steps.

What is claimed is:

1. A computing device comprising:
a communication device;
a processor to:
receive a request to generate a temporary password for a client device, wherein the request includes a set of credentials and identification information of the client device;
authenticate the request using the set of credentials;
in response to a successful authentication of the request, generate the temporary password;
transmit the temporary password, firmware access information, and expiration information of the temporary password to the client device; and
transmit the temporary password to a password receiving entity based on a data structure in the computing device that specifies the password receiving entity and a manner by which the transmission of the temporary password to the password receiving entity is to occur.

2. The computing device of claim 1, wherein the processor is to:
upon an expiration of the temporary password, generate a new password for the client device; and
transmit the new password to the client device.

3. The computing device of claim 1, wherein the identification information includes an Internet Protocol (IP) address, an identifier of the client device, or a combination thereof.

4. The computing device of claim 1, wherein the password receiving entity includes a second computing device that is different than the client device, an email address, a printer, a cellular phone, or a combination thereof.

5. A method, comprising:
receiving a request to generate a temporary password for a client device, wherein the request includes a set of credentials and identification information of the client device;
authenticating the request using the set of credentials;
in response to a successful authentication of the request, generating the temporary password;
transmitting the temporary password, firmware access information, and expiration information of the temporary password to the client device; and transmitting the temporary password to a password receiving entity based on a data structure in a computing device that specifies the password receiving entity and a manner by which the transmission of the temporary password to the password receiving entity is to occur.

6. The method of claim 5, wherein the data structure includes a phone number, an email address, or a combination thereof of the password receiving entity.

7. The method of claim 5, further comprising:
upon an expiration of the temporary password, generating a new password for the client device; and
transmitting the new password to the client device.

8. A non-transitory computer-readable medium storing executable code, which, when executed by a processor, causes the processor to:
receive a request to generate a temporary password for a client device, wherein the request includes a set of credentials and identification information of the client device;
authenticate the request using the set of credentials;
in response to a successful authentication of the request, generate the temporary password;
transmit the temporary password, firmware access information, and expiration information of the temporary password to the client device; and
transmit the temporary password to a password receiving entity based on a data structure in a computing device that specifies the password receiving entity and a manner by which the transmission of the temporary password to the password receiving entity is to occur.

9. The non-transitory computer-readable medium of claim 8, wherein the data structure includes a phone number, an email address, or a combination thereof of the password receiving entity.

10. The non-transitory computer-readable medium of claim 8, wherein the password receiving entity includes a second computing device that is different than the client device, an email address, a printer, a cellular phone, or a combination thereof.

\* \* \* \* \*